United States Patent
Lin et al.

(10) Patent No.: US 9,121,409 B2
(45) Date of Patent: Sep. 1, 2015

(54) PORTABLE ELECTRONIC DEVICE WITH TILTEDLY INSTALLED CENTRIFUGAL FAN

(75) Inventors: Ming-Hsien Lin, Taipei (TW); Yun-Jeng Lin, Taipei (TW); Yu-Hsun Lin, Taoyuan County (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 572 days.

(21) Appl. No.: 13/569,897

(22) Filed: Aug. 8, 2012

(65) Prior Publication Data

US 2014/0044530 A1    Feb. 13, 2014

(51) Int. Cl.
*F04D 17/16* (2006.01)
*F04D 25/06* (2006.01)
*F04D 29/60* (2006.01)
*G06F 1/20* (2006.01)

(52) U.S. Cl.
CPC ............ *F04D 17/16* (2013.01); *F04D 25/0613* (2013.01); *F04D 29/601* (2013.01); *G06F 1/203* (2013.01)

(58) Field of Classification Search
CPC ..... F04D 17/16; F04D 29/601; F04D 29/582; G06F 1/203

USPC .......................................... 361/695; 416/185
See application file for complete search history.

(56) References Cited

U.S. PATENT DOCUMENTS

| 2008/0049394 A1* | 2/2008 | Nishi ............................ 361/695 |
| 2010/0103616 A1* | 4/2010 | Hwang et al. ................. 361/695 |
| 2011/0080710 A1* | 4/2011 | Sugiura et al. ................ 361/697 |

* cited by examiner

*Primary Examiner* — Dwayne J White
*Assistant Examiner* — Adam W Brown
(74) *Attorney, Agent, or Firm* — Rabin & Berdo, P.C.

(57) ABSTRACT

A portable electronic device includes a main body and a heat dissipation module with a tiltedly installed centrifugal fan inside thereof. The main body includes an upper housing wall and a lower housing wall. The heat dissipation module includes a centrifugal fan, a heat dissipation fin array and a heat pipe. The centrifugal fan includes an impeller, a radial air outlet, an upper axial air inlet and a lower axial air inlet, wherein the centrifugal fan has a first side that is in contact with the upper housing wall and an opposite second side that is in contact with the lower housing wall. The heat dissipation fin array is located at the radial air outlet of the centrifugal fan. The heat pipe has a first end connected with the heat dissipation fin array and a second opposite end connected with a heat source.

7 Claims, 5 Drawing Sheets

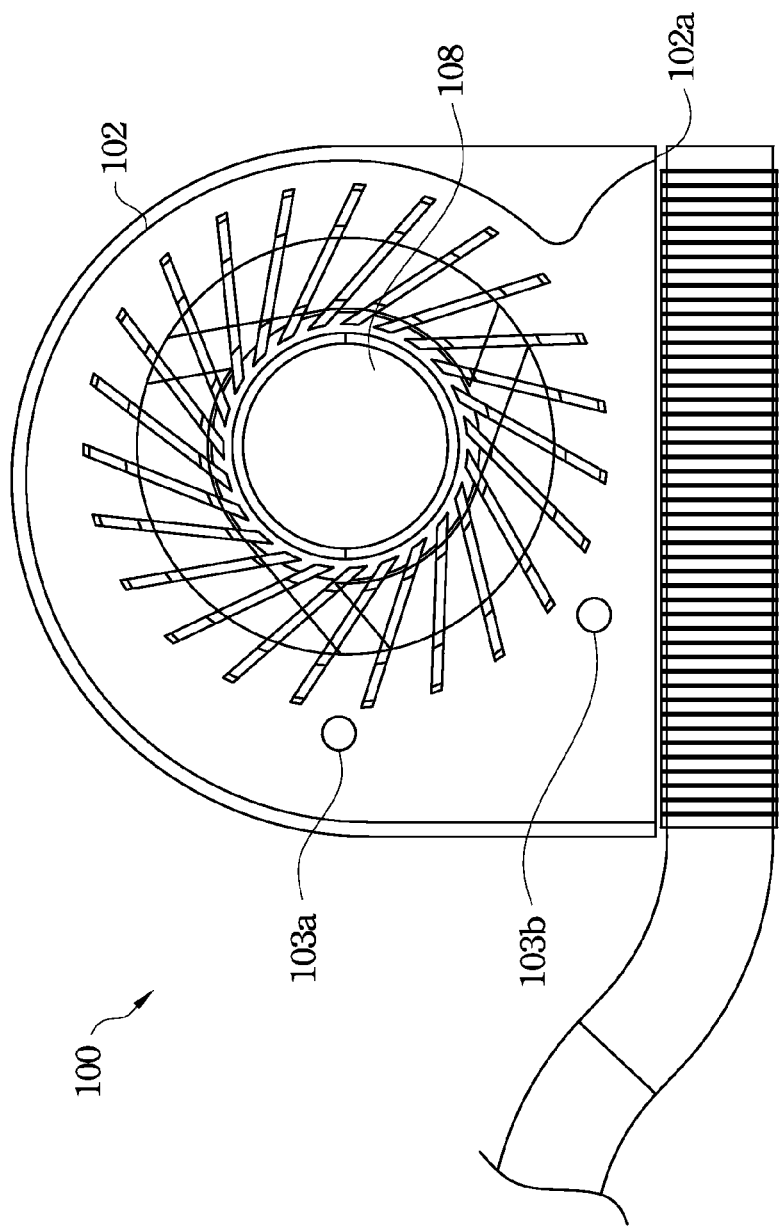

PORTABLE ELECTRONIC DEVICE WITH TILTEDLY INSTALLED CENTRIFUGAL FAN

BACKGROUND

1. Field of Invention

The present invention relates to a heat dissipation module. More particularly, the present invention relates to a heat dissipation module equipped with a centrifugal fan.

2. Description of Related Art

A heat dissipation module equipped with a centrifugal fan is used in most notebook computers as their system coolers. The heat dissipation module includes a centrifugal fan, a heat pipe and a heat dissipation fin array. An first end of the heat pipe is used to connect with a heat source, e.g., a CPU, while a second opposite end of the heat pipe is used to connect with the heat dissipation fin array, thereby transferring heat from the heat source to the heat dissipation fin array. The heat dissipation fin array is fastened to an air outlet of the centrifugal fan. When an impeller of the centrifugal fan rotates, airflows carry the heat on the heat dissipation fin array out of the notebook computer.

However, the notebook computers are designed to be thin and compact, the dissipation modules inside them are also designed to be thinner. When the notebook computers are designed to be less than 20 mm in thickness, a gap between the dissipation module and a top cover or between the dissipation module and a bottom cover becomes narrower. Thus, the centrifugal fan may draw not enough input air from its axial air inlet and perform not very well in the heat dissipation efficiency. For the forgoing reasons, there is a need for dealing the heat dissipation efficiency issue due to the thinner notebook computer design.

SUMMARY

It is therefore an objective of the present invention to provide a thin portable electronic device with an improved heat dissipation module In accordance with the foregoing and other objectives of the present invention, a portable electronic device includes a main body and a heat dissipation module with a tiltedly installed centrifugal fan inside thereof. The main body includes an upper housing wall and a lower housing wall. The heat dissipation module includes a centrifugal fan, a heat dissipation fin array and a heat pipe. The centrifugal fan includes an impeller, a radial air outlet, an upper axial air inlet and a lower axial air inlet, wherein the centrifugal fan has a first side that is in contact with the upper housing wall and an opposite second side that is in contact with the lower housing wall. The heat dissipation fin array is located at the radial air outlet of the centrifugal fan. The heat pipe has a first end connected with the heat dissipation fin array and a second opposite end connected with a heat source.

According to another embodiment disclosed herein, the radial air outlet is located at the first side of the centrifugal fan.

According to another embodiment disclosed herein, the radial air outlet is located at the second side of the centrifugal fan.

According to another embodiment disclosed herein, a support member located between the first side of the centrifugal fan and the lower housing wall.

According to another embodiment disclosed herein, the support member is a sponge.

According to another embodiment disclosed herein, a support member located between the second side of the centrifugal fan and the upper housing wall.

According to another embodiment disclosed herein, the second side of the centrifugal fan has a first thickness that is thinner than a second thickness of the remaining portion of the centrifugal fan.

According to another embodiment disclosed herein, the upper axial air inlet is located between a center of the impeller and the second side of the centrifugal fan.

According to another embodiment disclosed herein, the lower axial air inlet is located between a center of the impeller and the first side of the centrifugal fan.

According to another embodiment disclosed herein, the heat pipe is located between the heat dissipation fin array and the lower housing wall.

According to another embodiment disclosed herein, the heat pipe is located between the heat dissipation fin array and the upper housing wall.

Thus, the heat dissipation module has its centrifugal fan tiltedly installed within a portable electronic device so as to obtain larger gaps for axial air inlets to introduce airflows easily.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5 illustrates a top view of the heat dissipation module in FIG. 1 with a top cover of the centrifugal fan removed.

DESCRIPTION OF THE PREFERRED EMBODIMENTS

Figure 1:
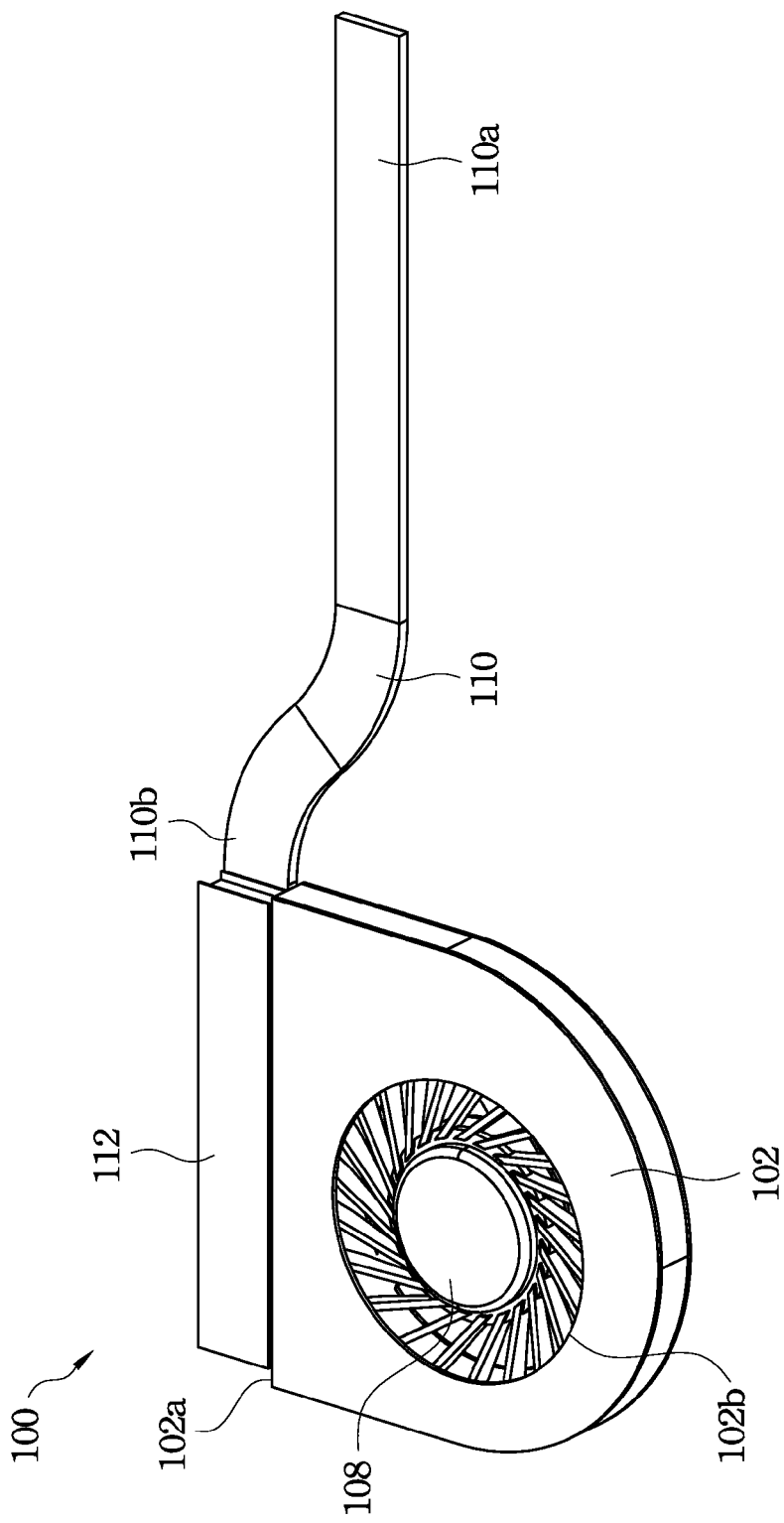
FIG. 1 illustrates a perspective view of a heat dissipation module according to a first embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a perspective view of a heat dissipation module according to a first embodiment of this invention. The heat dissipation module 100 illustrated in FIG. 1 is used in most notebook computers as their system cooler. The heat dissipation module 100 includes a centrifugal fan 102, a heat pipe 110 and a heat dissipation fin array 112. The heat dissipation fin array 112 includes multiple dissipation fins which are arranged in parallel with an airflow direction of a radial air outlet 102a. A first end 110b of the heat pipe 110 is used to connect with the heat dissipation fin array 112 while an opposite second end 110a of the heat pipe 110 is used to connect with a heat source, e.g., a CPU, (not illustrated in the drawings), thereby transferring heat from the second end 110a to the first end 110b and the heat dissipation fin array 112. The heat dissipation fin array 112 is fastened to a radial air outlet 102a of the centrifugal fan 102. When an impeller 108 of the centrifugal fan 102 rotates, airflows are drawn into the centrifugal fan 102 from an axial air inlet 102b and output from the radial air outlet 102a. Therefore, the heat upon the heat dissipation fin array 112 is carried out of the portable electronic device by the airflows.

Figure 2:
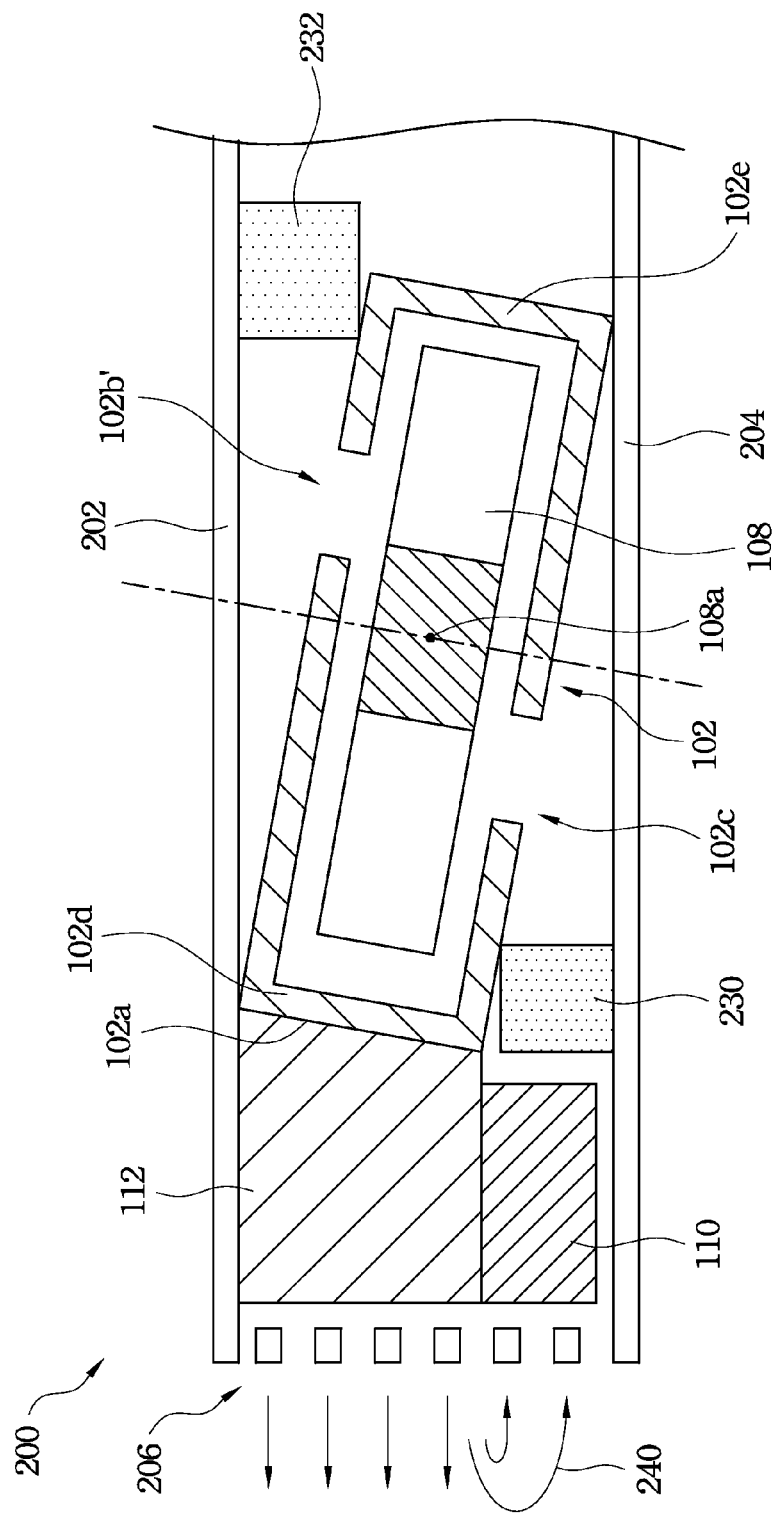
FIG. 2 illustrates a cross-sectional view of a portable electronic device with a heat dissipation module according to a second embodiment of this invention.

FIG. 2 illustrates a cross-sectional view of a portable electronic device with a heat dissipation module according to a second embodiment of this invention. A main body 200 of a portable electronic device, e.g., a notebook computer, is equipped with a heat dissipation module between an upper housing wall 202 and a lower housing wall 204. The heat dissipation module includes a centrifugal fan 102, a heat dissipation fin array 112 and a heat pipe 110. The heat dissipation fin array 112 is located near a group of vent holes 206 on a sidewall of the main body 200. Because a distance between the upper housing wall 202 and the lower housing wall 204 is narrow, e.g., less than 20 mm, the centrifugal fan 102 is tilted with a side 102d in contact with the upper housing wall 202 and an opposite side 102e in contact with the lower housing wall 204 so as to enhance its heat dissipation performance. In particular, the centrifugal fan 102 is tilted to enable its axial air inlets to introduce airflows easily. In this embodiment, an upper axial air inlet 102b', a lower axial air inlet 102c and a radial air outlet 102a are designed on the centrifugal fan 102. The heat dissipation fin array 112 is fastened to the radial air outlet 102a of the centrifugal fan 102. When an impeller 108 of the centrifugal fan 102 rotates, airflows are drawn into the centrifugal fan 102 from the upper axial air inlet 102b' and the lower axial air inlet 102c and output from the radial air outlet 102a. Therefore, the heat upon the heat dissipation fin array 112 is carried out of the portable electronic device by the airflows. In order to obtain better heat dissipation performance, the upper axial air inlet 102b' may be located between a center 108a of the impeller 108 and the side 102e while the lower axial air inlet 102c may be located between the center 108a of the impeller 108 and the side 102d to introduce airflows easily. In order to firmly secure the centrifugal fan 102, a support member 230 may be installed between the side 102d and the lower housing wall 204 while a support member 232 may be installed between the side 102e and the upper housing wall 202. In this embodiment, the support member 230 may be a sponge to prevent reverse airflows 240 at the vent holes 206 from occurring. In addition, the radial air outlet 102a is located at the side 102d of the centrifugal fan 102 and the heat pipe 110 is located between the heat dissipation fin array 112 and the lower housing wall 204.

Figure 3:
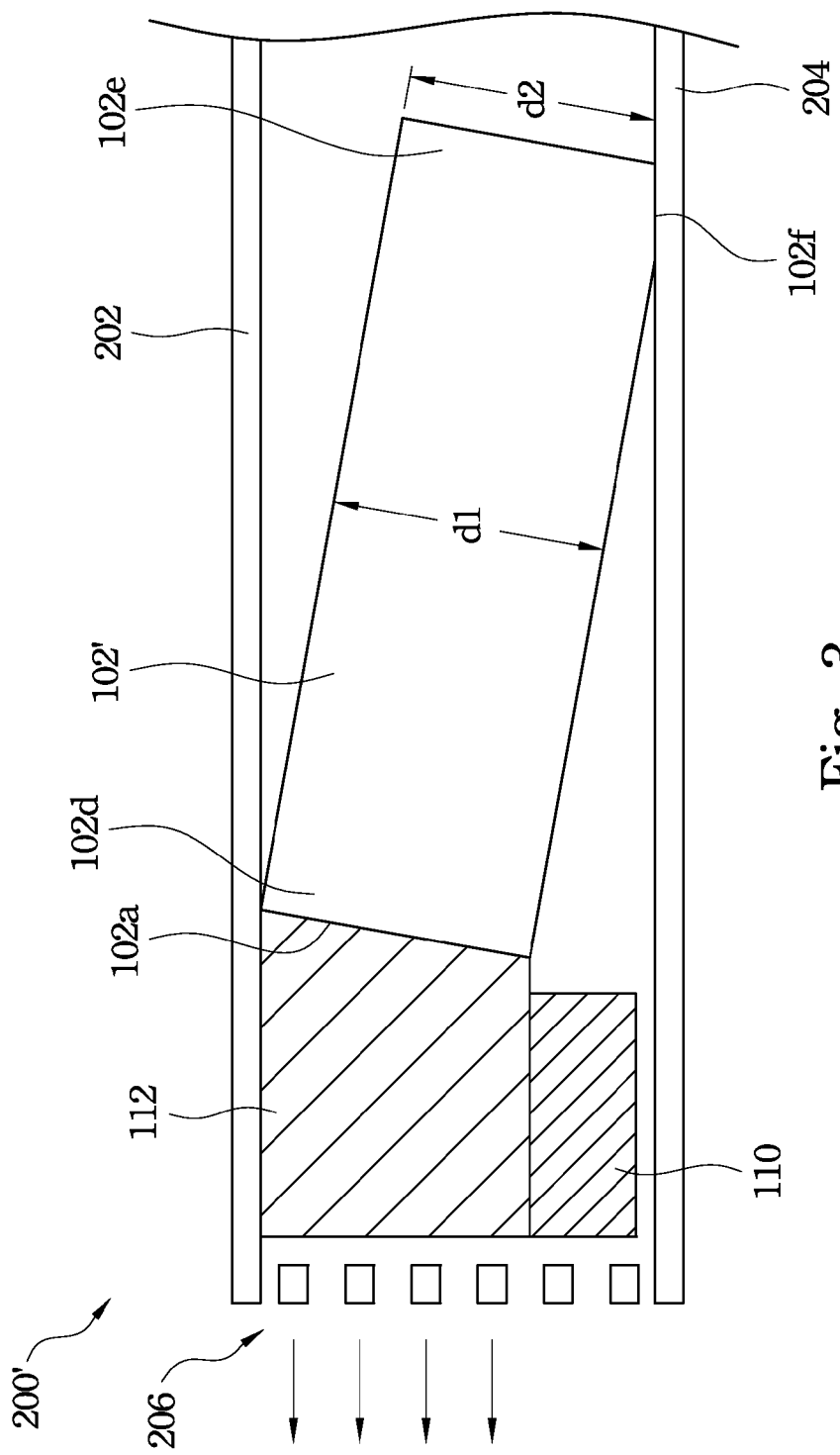
FIG. 3 illustrates a cross-sectional view of a portable electronic device with a heat dissipation module according to a third embodiment of this invention.

FIG. 3 illustrates a cross-sectional view of a portable electronic device 200' with a heat dissipation module according to a third embodiment of this invention. The third embodiment is different from the second embodiment in that the side 102e has a cutoff edge 102f. Due to the cutoff edge 102f, the centrifugal fan 102' is tilted more to obtain larger gaps for axial air inlets to introduce airflows easily. Because of the cutoff edge 102f, the side 102e of the centrifugal fan 102' has a first thickness $d_2$ that is thinner than the remaining portion (equipped with a second thickness $d_1$) of the centrifugal fan 102'. The cutoff edge 102f only reduces the housing size of the centrifugal fan 102', and does not affect the size of the impeller inside the housing. The portable electronic device 200' may be further equipped with the support members as described in the second embodiment.

Figure 4:
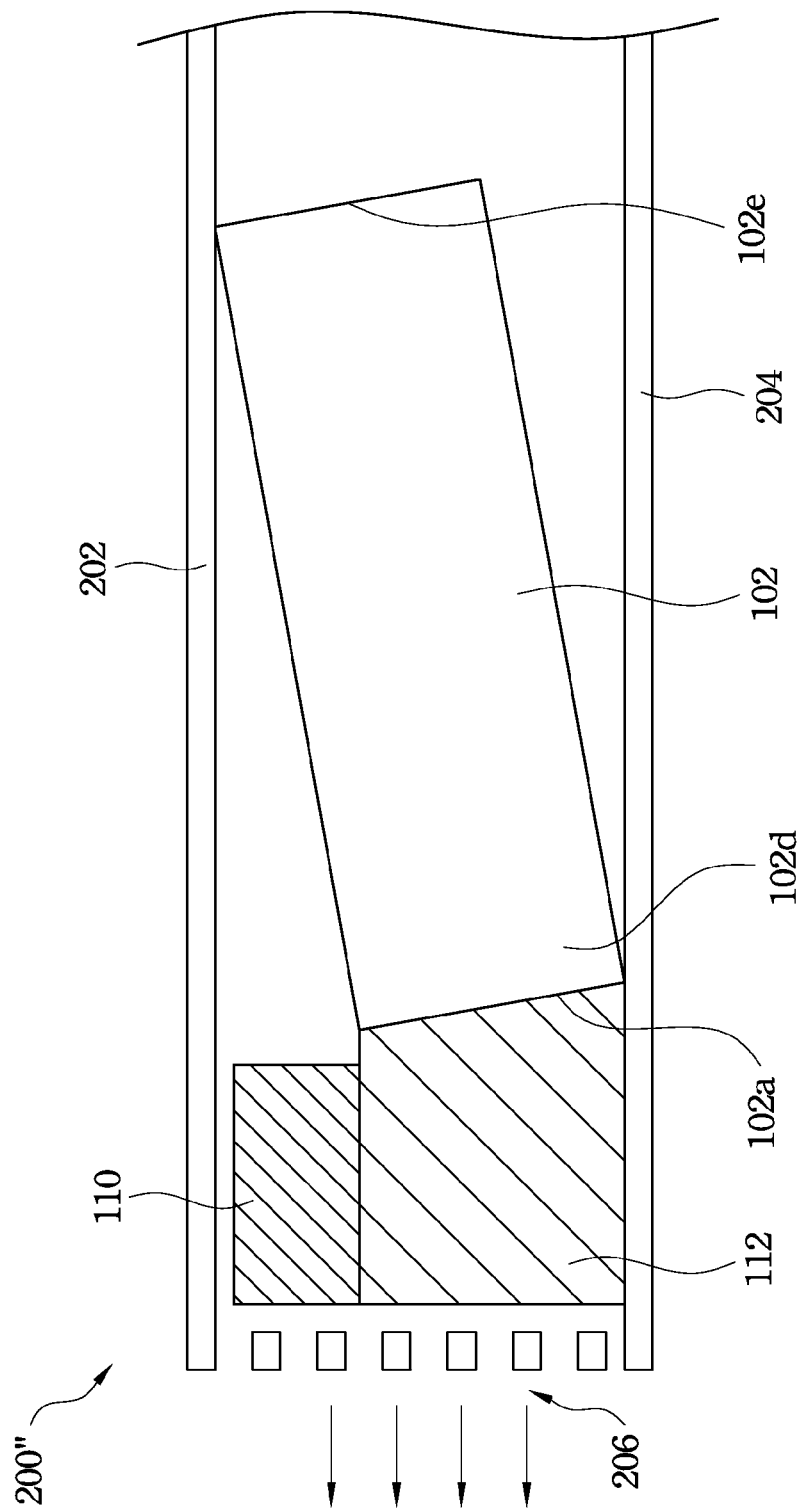
FIG. 4 illustrates a cross-sectional view of a portable electronic device with a heat dissipation module according to a fourth embodiment of this invention.

FIG. 4 illustrates a cross-sectional view of a portable electronic device 200" with a heat dissipation module according to a fourth embodiment of this invention. The fourth embodiment is different from the second and third embodiment mainly in that the centrifugal fan 102 is tilted with a side 102d in contact with the lower housing wall 204 and an opposite side 102e in contact with the upper housing wall 202 so as to enhance its heat dissipation performance. In particular, the centrifugal fan 102 is tilted to enable its axial air inlets to introduce airflows easily. In this embodiment, the radial air outlet 102a is located at the side 102d of the centrifugal fan 102 and the heat pipe 110 is located between the heat dissipation fin array 112 and the upper housing wall 202. The portable electronic device 200" may be further equipped with the support members and/or the cutoff edge as described in the second and third embodiment.

FIG. 5 illustrates a top view of the heat dissipation module in FIG. 1 with a top cover of the centrifugal fan removed. In case the outer housing of the centrifugal fan 102 is made from plastic materials, inner support ribs may be designed inside the outer housing such that the centrifugal fan 102 is rigid enough to against outer pressings. In this embodiment, two inner support ribs (103a, 103b) are designed inside the outer housing. The inner support rib 103b is located between the radial air outlet 102a of the centrifugal fan 102 and the impeller 108. The inner support ribs 103a is located within an inner airflow channel and near the impeller 108. When the centrifugal fan 102 is pressed, the inner support ribs (103a, 103b) can prevent its upper housing wall and lower housing wall from being overly bent such that the impeller 108 would not interfere with the upper housing wall and lower housing wall to make noises.

According to the above-discussed embodiments, the heat dissipation module has its centrifugal fan tiltedly installed within a portable electronic device so as to obtain larger gaps for axial air inlets to introduce airflows easily.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic, device comprising:
 a main body comprising an upper housing wall and a lower housing wall; and
 a heat dissipation module, comprising:
  a centrifugal fan comprising an impeller, a radial air outlet, an upper axial air inlet and a lower axial air inlet, wherein the centrifugal fan comprises a first side that is in contact with the upper housing wall and an opposite second side that is in contact with the lower housing wall, wherein the radial air outlet is disposed at the first side of the centrifugal fan, and the second side of the centrifugal fan has a first thickness that is thinner than a second thickness of the remaining portion of the centrifugal fan;
  a heat dissipation fin array disposed at the radial air outlet of the centrifugal fan; and
  a heat pipe having a first end connected with the heat dissipation fin array and a second opposite end connected with a heat source.

2. The portable electronic device of claim 1, wherein the upper axial air inlet is disposed between a center of the impeller and the second side of the centrifugal fan.

3. The portable electronic device of claim 2, wherein the lower axial air inlet is disposed between the center of the impeller and the first side of the centrifugal fan.

4. The portable electronic device of claim 1, wherein the heat pipe is disposed between the heat dissipation fin array and the lower housing wall.

5. The portable electronic device of claim 1 further comprising a support member disposed between the first side of the centrifugal fan and the lower housing wall.

6. The portable electronic device of claim 5, wherein the support member is a sponge.

7. The portable electronic device of claim 1 further comprising a support member disposed between the second side of the centrifugal fan and the upper housing wall.

\* \* \* \* \*